No. 731,736. PATENTED JUNE 23, 1903.
V. D. ANDERSON.
METHOD OF EXPRESSING OIL FROM SEEDS.
APPLICATION FILED MAY 2, 1902.
NO MODEL. 3 SHEETS—SHEET 2.
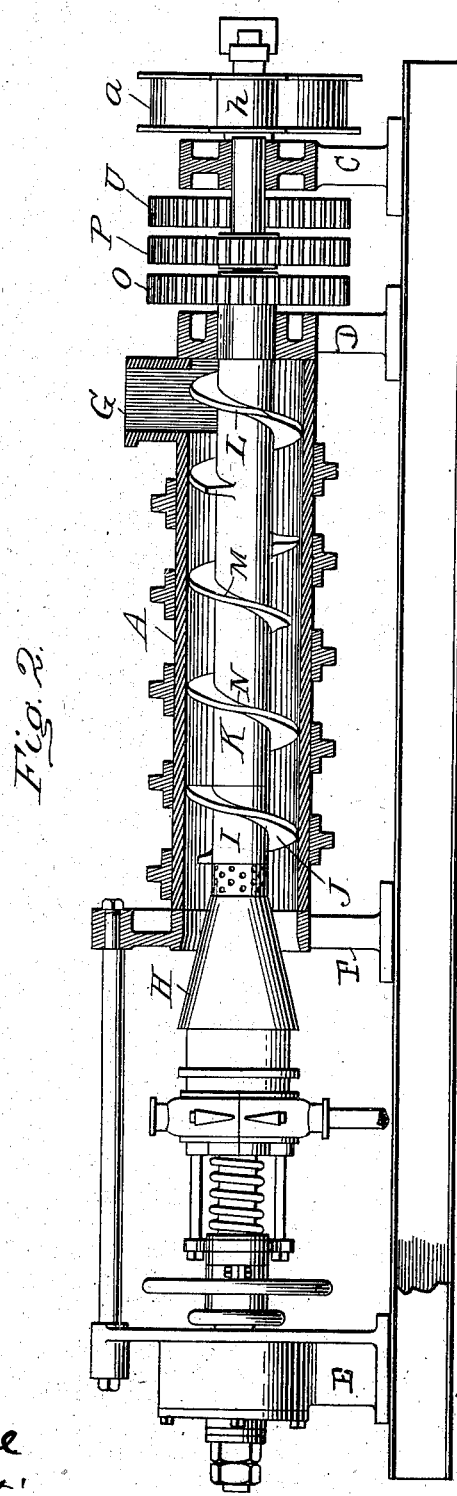

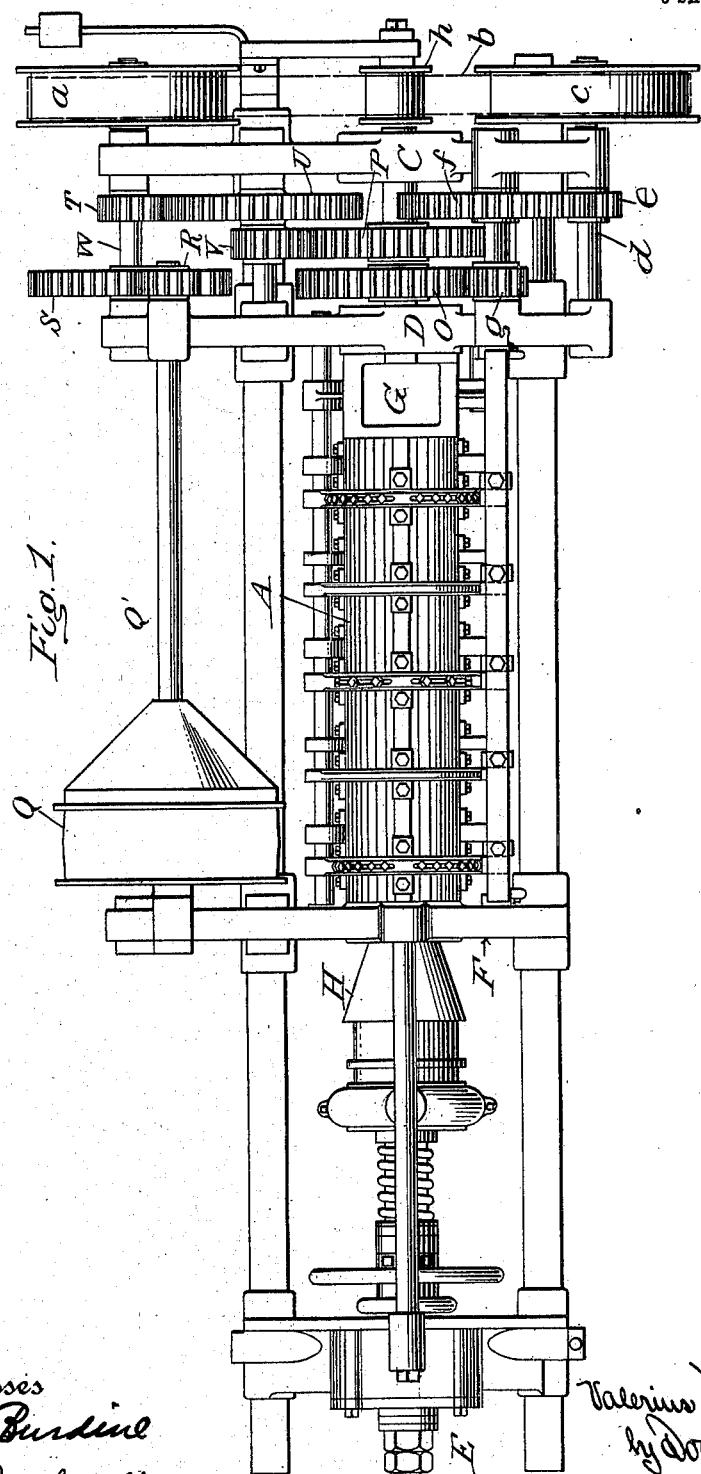

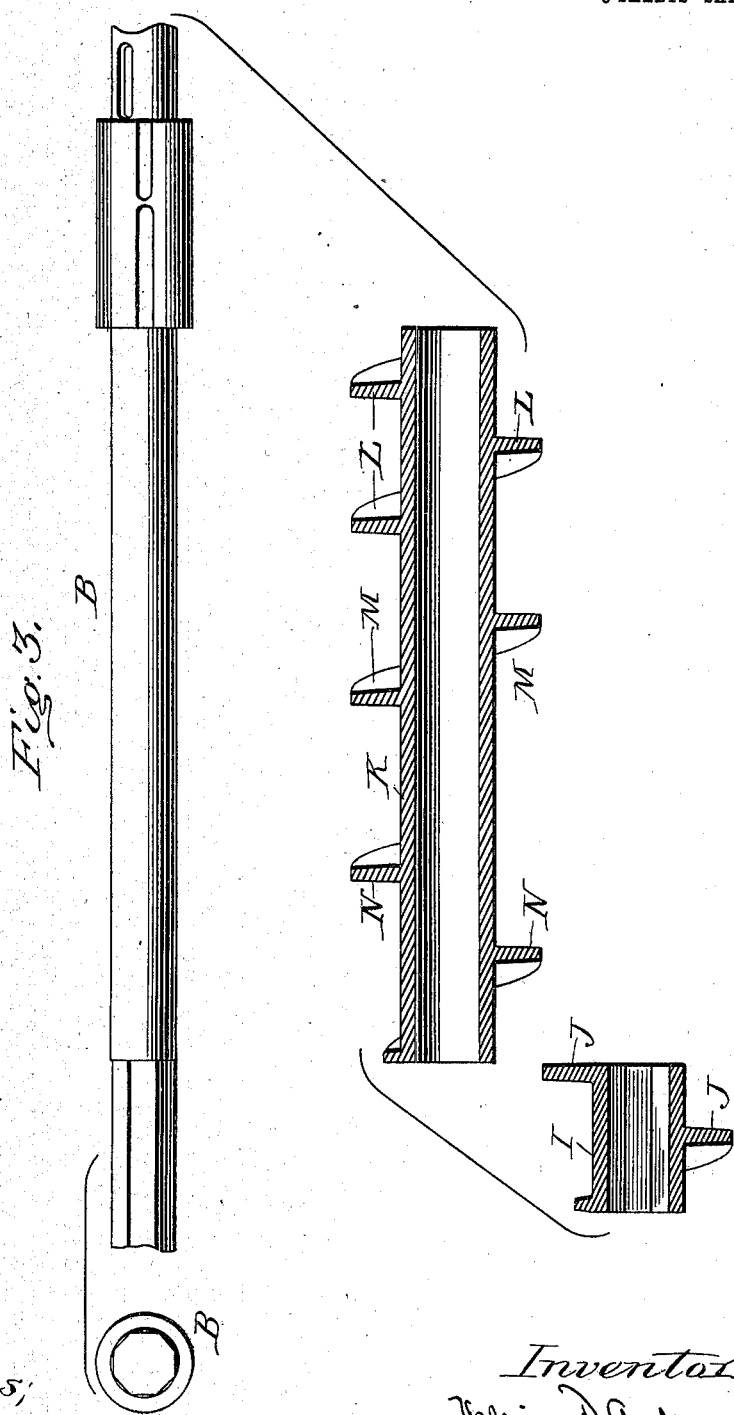

No. 731,736.

Patented June 23, 1903.

UNITED STATES PATENT OFFICE.

VALERIUS D. ANDERSON, OF CLEVELAND, OHIO.

METHOD OF EXPRESSING OIL FROM SEEDS.

SPECIFICATION forming part of Letters Patent No. 731,736, dated June 23, 1903.

Application filed May 2, 1902. Serial No. 105,674. (No specimens.)

*To all whom it may concern:*

Be it known that I, VALERIUS D. ANDERSON, a citizen of the United States, residing at Cleveland, in the county of Cuyahoga and State of Ohio, have invented certain new and useful Improvements in Processes or Methods of Expressing Oil from Seeds, of which the following is a specification.

My present invention pertains to an improved process of expressing oils, reference being had to the annexed drawings, showing one embodiment of an apparatus for carrying out the process.

In said drawings, Figure 1 is a top plan view of a press; Fig. 2, a longitudinal sectional view, and Fig. 3 a detail view.

The object of the present invention is to effect the expression of oil from various seeds in a manner much more satisfactory and efficient both as to quality and quantity of the product and also in point of cost than can be done by any of the known methods now in use.

By my method the oil is all expressed cold, the quality is equal or even throughout, there being no varying grades, and the seeds are used whole and without previous treatment of any kind.

The nature or class of the seeds from which the oil may be expressed by my process includes those which have a fibrous hull or covering—such, for instance, as cotton-seed, linseed, mustard-seed, flaxseed, and the like—though the process is designed for use more particularly with cotton-seed and linseed, with which results of a most satisfactory nature and high degree of efficiency have been obtained in actual use.

In the treatment of seeds for the expression of oil the method most generally employed at this time is to first disintegrate the seeds and in the case of upland cotton-seed screen or separate the hulls or fiber from the meat or kernel of the seeds, crush or grind the meat or kernel to break down the oil-cells, cook the crushed mass, place this mass in the press, employing mats, and then press to express the oil, hydraulic presses being commonly employed. Frequently the pressed cake is broken up, heated, again subjected to pressure, and the cake formed by the second compression again broken up, subjected to a still higher degree of heat, and again compressed. Naturally the oil obtained by the three compressions varies in quality, yet in practice it is found necessary to so treat the mass in order to express the oil to such a degree as to render the process commercially successful. Each heating renders the resultant oil of less value than the cold-pressed oil.

With my process the seeds are fed into the machine whole and there broken up and the oil completely "expressed," commercially speaking—that is to say, expressed down to about five per cent. No heating or previous treatment is necessary. The seeds are crushed and torn apart and the oil-cells thereby completely ruptured, the pressure being such that the fibrous shells are condensed and formed into what may be called "mat" for the want of a better term, which mat is kept under constant pressure throughout, so that the oil cannot be absorbed thereby. Consequently as the cells in the meat or kernel are broken down the oil is forced out therefrom and passes through and from the mat to the outside of the press. It will at once be seen that a process acting in this direct manner is not only quick, but advantageous from the fact that no previous treatment of the seeds is necessary. As before stated, the mass is practically freed of oil—that is to say, it is brought down to about five per cent.

In the accompanying drawings I have shown one form of a press by which the method may be practiced.

Mounted within a shell or casing A, perforated throughout its length or a portion thereof, as may be found necessary, is a shaft B, which has bearings in the head-frames C D and in the foot-frame E. Shell A occupies a position between and is supported by frame D and an intermediate frame or casting F. The forward or head end of the shell or casing is provided with a feed-hopper G, and the material which is fed into said hopper is discharged at the opposite end against a head H, mounted upon the shaft. The shaft at this point is polygonal in cross-section, so that although the head rotates therewith, yet it may be moved toward or from the shell, as occasion may require, suitable means being provided to effect the desired adjustment. The polygonal portion of the shaft also carries a sleeve or collar I, having a worm J formed thereon, said member occupying a position within the discharge end of the shell or casing and rotating with the shaft. The remaining portion of the shaft is cylindrical in form and has mounted upon it a quill or sleeve K, which has a series of separated screws L, M, and N formed thereon. A gear O is secured to an extension of the sleeve, which projects out between the head-frames C and D, and a similar gear P is secured to the shaft.

Q denotes a clutch-pulley or other source of power, motion being imparted therefrom to a gear R, and thence to gear P, through gears S, T, U, and V.

The shaft W, which carries gears S and T, also carries a pulley $a$, and a straight belt $b$ extends therefrom to a similar pulley $c$, mounted upon a shaft $d$ at the opposite side of the frame. Shaft $d$ has secured to it a gear $e$, which in turn imparts motion to gear O through intermediate gears $f$ and $g$. A weighted tightener-pulley $h$ bears on the belt.

When the press is running empty, the gears O and P will, with the arrangement shown, rotate in unison, so that the same rate of rotation will be imparted to the quill and to the shaft. When, however, a certain degree of pressure is exerted or reached in the feed end of the shell, or in that portion within which the quill works, the belt will slip in a greater or less degree, depending upon the pressure exerted upon the belt by the tightener. Thus while the end screw J rotates continuously the quill and its screws rotate intermittently or rotate at varying rates of speed.

The action is as follows, assuming that whole cotton-seed or linseed is being run through the press: The whole seed is fed into the hopper and is caught by the first screw L. The material is carried around and forced forward by the screw into the space between it and the next screw M. The seed is partially disintegrated and is compacted into the space until a certain degree of compression is effected, when screw M takes hold and acts on the mass. The farther along the mass goes in its travel through the press the greater the degree of compression, which compression is maintained at all times. The seed is effectually broken up, the oil-cells ruptured, and the oil forced out. Screw M acts in the same manner as screw L, forcing the material on toward screw N, which in turn forces it toward screw J. Screw J then takes it up, effects the final compression, and forces it out against the head H. Said head forms an abutment against which the screw will force the material, and it also serves to break up the material or mat as it leaves the press. The mass may be said to be subjected to a torsional strain or pressure as it passes through the press. In the treatment of seeds having fibrous hulls the screws carried by the quill will so effectually compress the mass and form such a hard cake or body that the discharge and final-compression screw cannot take hold of it unless means be provided whereby the further compression is stopped until the discharge-screw can relieve the press to a certain extent. In other words, the compression in the major portion of the press is momentarily arrested; but that degree of pressure attained is still held to prevent reabsorption of the oil by the fibrous portion of the shell and the meat or kernel until such time as the discharge-screw shall have sufficiently cleared or relieved the press to enable the whole press to operate again.

The action above described is that which is thought to actually take place, and whether it be absolutely correct or not the fact remains that the oil is completely expressed (commercially speaking) from the whole seed, and the remaining mass contains simply the hulls and dry meat or kernel. This material may be broken up, separated into its constituent elements, and used in a manner similar to the products resulting from the old method of treatment.

The mat, as will be noted, is held under constant pressure, which pressure increases toward the discharge end of the press. As before stated, this pressure prevents the absorption of the oil by the mat, permitting it to pass therethrough in a clear condition. In other words, the fibrous portions of the seed act as a strainer or filtering medium for the oil, all fine or floating particles being held back thereby. This also is a point of material advantage incident to the use of my process. Moreover, the process when carried out with the apparatus above described or the equivalent thereof is a continuous one, the whole seed being constantly fed in at one end and the resultant cake withdrawn or forced out of the other end of the press.

It is to be clearly understood that I do not limit myself to the employment of the apparatus shown and described for carrying out my method, as any apparatus may be employed by which the method may be effected.

While I have stated that no heating or other treatment of the seed is necessary before placing it within the press, which statement is borne out by practice, still should the condition of the seed in any particular case from any cause whatsoever render such course necessary I deem it within my right to employ such step without affecting the scope of my invention.

No claim is herein made to the apparatus shown and described, as that is reserved for the subject-matter of another application to be filed in my name.

Having described my invention, what I claim is—

1. The process of expressing oil from seeds, which consists in subjecting the whole seeds to disintegration and compression, and maintaining the compression throughout the mass until the oil is expressed.

2. The process of expressing oil from seeds, which consists in subjecting the whole seeds to disintegration and compression, and gradually increasing the pressure upon the mass until the oil is expressed.

3. The process of expressing oil from seeds, which consists in subjecting the whole seeds to disintegration and compression, whereby the oil-cells are ruptured and a compressed mat is formed through which the oil is forced and filtered, and maintaining the pressure on the mat thus formed until the oil is expressed therefrom and from the meat portions of the seeds.

4. The process of expressing oil from seeds, which consists in subjecting the whole seeds to disintegration and compression, whereby the oil-cells are ruptured and a compressed mat is formed, and maintaining and gradually increasing the pressure upon the mass until the oil is expressed.

5. The process of expressing oil from seeds, which consists in subjecting the whole seeds to disintegration and compression, whereby the oil-cells are ruptured and a mat is formed of the fibrous portions of the seeds; maintaining and gradually increasing the pressure on the mass until a determinate pressure is reached; withdrawing that portion of the mass from which the oil has been expressed; and at the same time supplying a further charge of seed whereby a constant quantity is being acted upon at all times and the requisite pressure is maintained throughout.

6. The process of expressing oil from seeds, which consists in disintegrating the whole seeds; subjecting the mass thus produced to pressure; and maintaining the pressure whereby a mat or filtering medium is formed of the fibrous portion of the seeds, from and through which the oil is pressed, substantially as described.

In testimony whereof I have signed my name to this specification in the presence of two subscribing witnesses.

VALERIUS D. ANDERSON.

Witnesses:
    FLORENCE BAILEY,
    WILBUR S. BAILEY.